R. G. KELLY.
EXTRA AUTOMOBILE SEAT.
APPLICATION FILED JAN. 2, 1917.
1,236,316.
Patented Aug. 7, 1917.
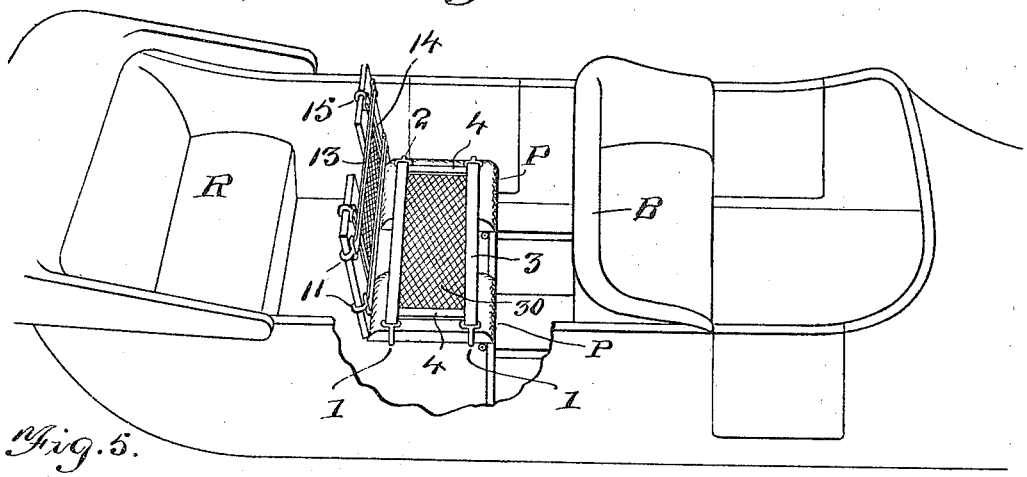
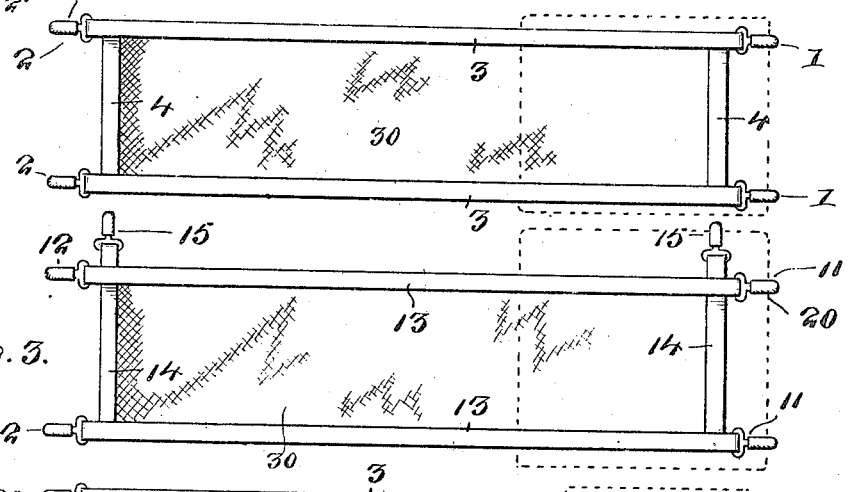
Witnesses
E. R. Ruppert.
N. L. Cleamer.
Inventor
Ruth G. Kelly
By Victor J. Evans
Attorney

UNITED STATES PATENT OFFICE.

RUTH GUERNSEY KELLY, OF CLIFTON, ARIZONA.

EXTRA AUTOMOBILE-SEAT.

1,236,316.   Specification of Letters Patent.   Patented Aug. 7, 1917.

Application filed January 2, 1917. Serial No. 140,186.

*To all whom it may concern:*

Be it known that I, RUTH G. KELLY, a citizen of the United States, residing at Clifton, in the county of Greenlee and State of Arizona, have invented new and useful Improvements in Extra Automobile-Seats, of which the following is a specification.

This invention relates to chairs, and more especially to those which fold; and the object of the same is to produce an extra seat for automobiles which may be folded up and stored in small space when not in use, but which may be slung or strung between the two emergency seats of a seven-passenger machine when it is desired to seat the eighth passenger. As usually constructed, a seven passenger-car accommodates two people on the front seat, three on the back seat and two additional passengers at times. These last are called upon to occupy seats which are hinged, pivoted, folded, or otherwise so constructed that they are brought into use but seldom and are generally folded or swung aside so as to give greater comfort to the three passengers sitting on the back seat. Occasions arise, however, when it is desired to seat an eighth passenger; and it is the purpose of the present invention to swing out said seats at such a time and to take from the tool box or other place of storage an eighth seat which can be quickly attached to said movable seats in a manner made clear below.

In this specification and drawings I have described and shown my invention as applied to spaced seats in a seven-passenger automobile, but it will be clear that it might be used to advantage between any other two spaced seats, and I reserve the broadest latitude in this respect.

In the accompanying drawings:

Figure 1 is a general perspective view of the rear portion of a seven-passenger automobile, showing my improved seat in use.

Fig. 2 is a plan view of the seat portion and Fig. 3 of the back portion of my attachment only, both showing the webbing partly broken away.

Fig. 4 is a plan view of the seat portion slightly amplified as by a net-work of straps described below.

Fig. 5 is a detail of one hook.

We are not concerned in this specification with the front seat of the automobile whose back B only is illustrated in Fig. 1, nor with the rear seat R which is usually upholstered and seats three adults; these parts are illustrated merely to show the relative position of the pivoted seats or emergency seats P, and need not be again referred to herein. Said emergency seats, as suggested above, may be of any of the well known types and shapes now on the market and in use, but it is essential to my invention that when swung into position for the sixth and seventh passengers they shall be spaced slightly from each other, as they usually are. I propose to utilize the space between these seats to accommodate an eighth passenger, and this I do by slinging my extra seat between the pivoted seats, which latter must therefore not turn under the weight of the eighth passenger.

Coming now to details, the numerals 1, 1 designate two hooks of thin, flat, but stiff spring metal to hook over the outer or right-hand edge of the right-hand seat P, and the numerals 2, 2 similar hooks to hook over the outer or left edge of the left-hand seat P. These hooks are respectively connected in pairs by flat straps 3 as of leather, webbing or the like, and the straps are connected at points over the shanks of the hooks by transverse straps 4. The two main or longitudinal straps 3 are each of a length to extend completely across both seats P and the space between them, and the two transverse straps 4 are of a length to keep the longitudinal straps from slipping off said seats. The four straps define a rectangular figure, and this may be filled in with additional straps 5, perhaps running both ways, as seen in Fig. 4.

In a similar manner there are two hooks 11, 11 to engage over the right edge of the right-hand seat-back, and two hooks 12, 12 to engage over the left edge of the left-hand seat-back, the longitudinal straps 13 connecting them in pairs, and transverse straps 14 connecting the straps 13; but in this case I make use of two additional hooks 15, 15 at the upper extremities of the transverse straps intended to hook over the tops of the backs of the pivoted seats to prevent this back structure from slipping downward. Here again the several straps define a rectangular figure long enough to reach across the backs of both pivoted seats and the space between them; and this rectangular figure may be filled in with additional straps to make a net-work as it were. Next I apply a filling of canvas or other sheet webbing to the straps defining said rectangular figure so that both the seat and the back are solid. It is immaterial whether these two elements are connected at the rear edge of the seat where they join, or not; but if they are, the entire device will be one unitary article.

Finally all hooks have their bends and their bills covered with cloth or rubber or some material 20 which will prevent them from marring the parts of the pivoted seats P over which they engage. This material is indicated in section by the black lines in Fig. 5, which I have used to show that the tip of the bill of the hook might be bent upward and somewhat rounded as at 2' so that it would bear frictionally against the bottom of the seat P and have a certain pinching action thereon. If the contour of said seat is square or rectangular as indicated in dotted lines in Fig. 2, the hooks 1 and 1 will stand opposite each other or alined; the same with the hooks 11 of the back as indicated in Fig. 3; but if the seat should be circular or oval as indicated in Fig. 4, the intermediate hook 20' should be disposed a little further outward than the other two hooks so as to conform with the configuration of the seat. It may be safe, however, to leave these details of construction to the manufacturer.

Ordinarily this extra seat is rolled up and stored either in the tool box or under the rear seat out of the way. When occasion for its use arises, it is taken out and unrolled, and its several hooks slipped over the pivoted seats which have first been swung out to their useful positions. If the seat element and back element are separate, the former can be slipped on from the front of the pivoted seats and the latter from the top of their backs, and the two elements will contact at the back of the seat. As this will be the easiest way of setting up my invention, doubtless I will construct it with that end in view. Now when the passengers take their places, the sixth and seventh passengers sit on the seats P, while the eighth person sits on the webbing between these passengers and may lean back as usual, and all will ride comfortably. While my extra seat is not upholstered, it is as it were suspended between two seats which are upholstered and therefore the person occupying it is spared the jars incident to rough travel which he would receive if he sat on a stool.

What is claimed as new is:—

1. The herein described extra seat for seven-passenger automobiles, the same consisting of a flexible panel having hooks at its ends to engage over the outer edges of the seat portions of the sixth and seventh seats and to span the space between them, and a back panel having hooks to engage over the outer edges of the back portions of said seats, substantially as described.

2. The herein described extra seat for seven-passenger automobiles, the same comprising a seat panel, means for detachably connecting it with the sixth and seventh seats, and a back panel composed of hooks to engage over the outer edges of the backs of the said seats, straps connecting them in pairs, transverse straps connecting the first-named straps, and additional hooks at the upper ends of said transverse straps to engage over the upper edges of the backs of said seats, for the purpose set forth.

3. The herein described seat for seven-passenger automobiles, the same comprising a seat panel and a back panel whereof each is made up of several longitudinal and transverse straps connected with each other and forming a substantially rectangular structure, webbing secured over the straps, hooks at both extremities of the longitudinal straps of both panels and at the upper extremities of the outermost transverse straps of the back panel, all hooks having the tips of their bills deflected inward and rounded to produce pinching action, and cushions inclosing the bills of all hooks, for the purpose set forth.

4. The combination with two spaced seats; of an extra seat composed of a seat panel whose ends overlie said seats and whose center spans the space between them, means for detachably connecting its extremities with the outer edges of said seats, a back panel whose ends overlie the backs of said seats and whose center spans the space between them, and means for detachably connecting its extremities to the outer edges of said backs, for the purpose set forth.

In testimony whereof I affix my signature.

RUTH GUERNSEY KELLY.

Copies of this patent may be obtained for five cents each, by addressing the "Commissioner of Patents, Washington, D. C."